Nov. 24, 1964 R. R. STONE, JR 3,158,810
FSK KEYING SYSTEM EMBODYING PHASE COHERENCE
Filed Sept. 28, 1962
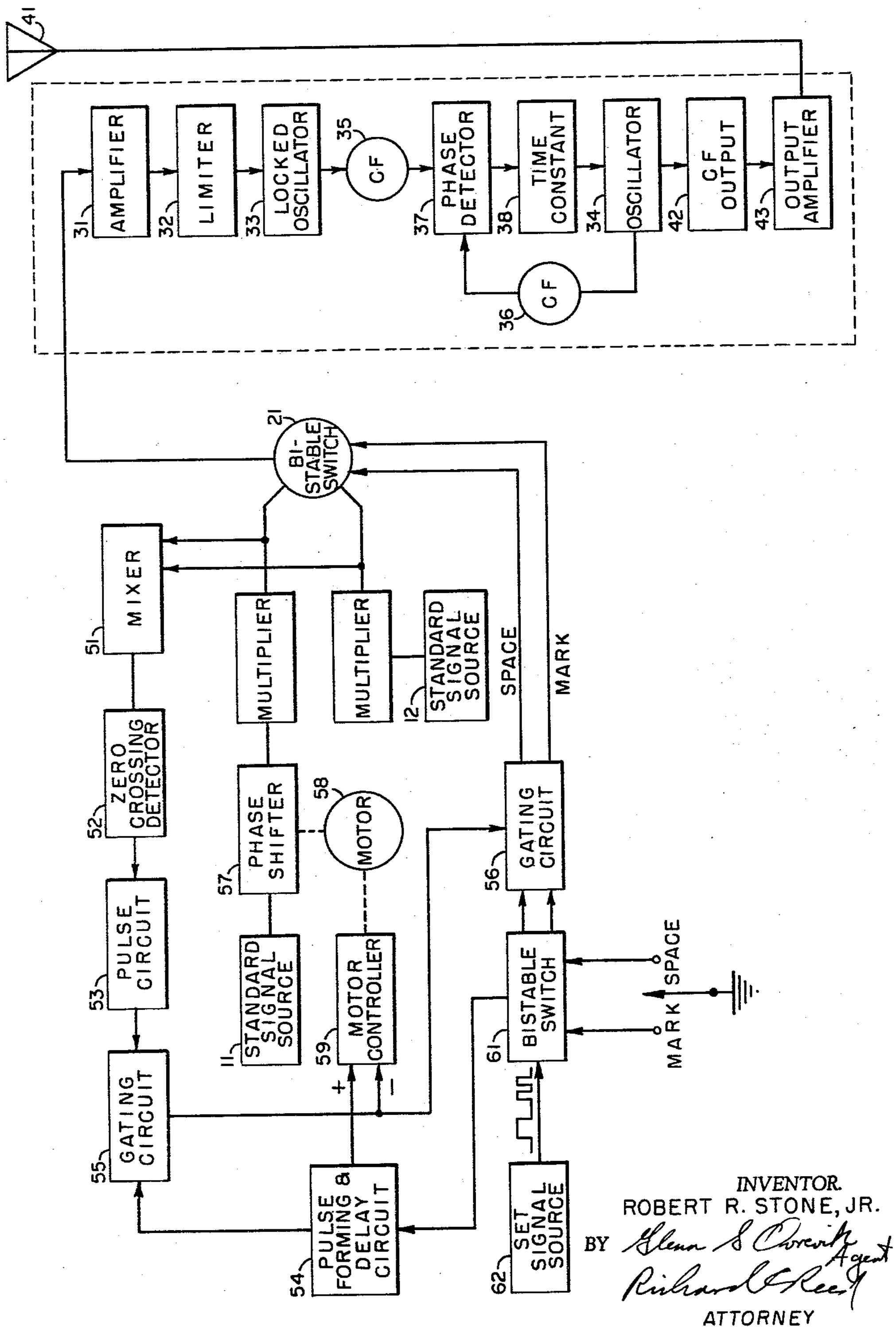
INVENTOR.
ROBERT R. STONE, JR.
BY Glenn S. Ovrevik Agent
Richard C. Reed
ATTORNEY

1

3,158,810

FSK KEYING SYSTEM EMBODYING PHASE COHERENCE

Robert R. Stone, Jr., Rosecroft Park, Md., assignor to the United States of America as represented by the Secretary of the Navy Filed Sept. 28, 1962, Ser. No. 227,677
4 Claims. (Cl. 325—163)
(Granted under Title 35, U.S. Code (1952), sec. 266)

The invention described herein may be manufactured and used by or for the Government of the United States of America for governmental purposes without the payment of any royalties thereon or therefor.

This invention relates in general to pulse communication systems operating in the VLF range, and in particular to such systems embodying frequency shift keying.

The reliability of low and very low frequencies for long distance communication has been repeatedly demonstrated since the inception of radio communication. As is well known in the art, communication at such frequencies is not greatly susceptible to the effects of solar disturbance and consequent ionospheric storms. Also, the increased skin depth in semiconductors at such frequencies permits transmission to submerged stations.

With the advent of supersonic aircraft, missiles, and space vehicles, the pressing need for more efficient and reliable use of the low end of the radio spectrum has become increasingly more evident and has given rise to communication systems in which close frequency control is required.

It is generally recognized that frequency shift keying affords optimum time utilization of signal transmission and that it is desirable to employ this type of keying in most pulse coded communication systems.

Prior to the introduction of the FSK systems described and claimed in copending applicating Serial No. 220,924 entitled "Narrow Band FSK System Employing Stabilized Frequency Control" which was filed in behalf of R. R. Stone, Jr. on August 31, 1962, phasing difficulties have greatly retarded the adaption of frequency shift keying to VLF applications, especially in those VLF applications where a precise selected phase relationship between stations is a critical requirement. In particular, unwanted sidebands which develop due to phasing discontinuity at the time of switching have presented a major obstacle to the adaption of FSK to many VLF applications. While the system described in the above-mentioned copending application has alleviated much of the difficulty encountered utilizing the prior art, it will be appreciated that the fast acting bistable switching means and associated circuitry of the system described therein is not especially adapted to compensate for mechanical switching difficulties which may arise.

Accordingly, it is an object of this invention to provide an improved frequency shift keying means adaptable for use in narrow band VLF applications.

It is a further object of this invention to provide an FSK system wherein keying arc-over is minimized.

Other objects of the invention will become apparent upon a more comprehensive understanding of the invention to which reference is had to the following specification and drawing wherein:

The figure illustrates a block diagram of the frequency shift keying means of this invention in a VLF embodiment of the type described in the above-mentioned copending application.

Briefly, the device of the invention is a positive action, frequency shift keying means embodying a phase correction means of the "boot strap" variety wherein the extent of deviation controls the extent of correction. Referring now to the drawing,

2

The figure is directed to a preferred embodiment of the FSK means of this invention wherein means are provided for monitoring and comparison of the outputs of the two frequency sources 11 and 12 having output frequencies $f_1$ and $f_2$ respectively. In the depicted embodiment monitoring and comparison is provided subsequent to multiplication by factor $x$ of the output frequencies. It will be appreciated, of course, that it is within the purview of this invention to provide for monitoring and comparison prior to multiplication by factor $x$, if desired, or to so provide subsequent to multiplication by a factor greater or lesser than $x$, by multiplication means not shown in the drawing, if warranted.

In accordance with the teaching in the above-mentioned copending application, the two frequency sources 11 and 12 are each connected to bistable switching means 21 by a respective frequency multiplier means wherein the output frequency is multiplied by a factor $x$, such as 4. The bistable switching means 21 is controlled by means, discussed in detail hereinafter, such that it is operative in response to pulse keying, for example.

The output of bistable switch means 21, alternately $4f_1$ and $4f_2$, is applied by amplifier 31 and limiter 32, for example, to locked oscillator divider means 33. Locked oscillator divider means 33 may be any conventional or otherwise oscillator divider means which will instantaneously lock in its input signal to the nearest point of phase. For example, the locked oscillator divider means 33 may be of the conventional Hartley or Colpitts variety, if desired.

In the illustrative embodiment of this figure, the output of locked oscillator means, alternately $f_1$ or $f_2$, feeds oscillator 34 by means of cathode follower 35, phase detector 37 which is also connected to the output of oscillator 34 by a cathode follower 36, and time constant means 38. It will be appreciated that phase detector 37, time constant means 38, and the oscillator 34 form a servo controlled system which effectively lengthens the time period of the "instantaneous" phase correction provided by lockin oscillator 33. The output of oscillator 34 is applied to the antenna 41 by a cathode follower 42 and output amplifier 43.

It will be appreciated, of course, that the specific servo controlled oscillator disclosed in the embodiment is not critical to the invention and that a wide variety of means for spreading transient time over a selected period may be substituted, if desired. For example, if linear control is not required, a narrow bandpass filter might be substituted for the servo controlled oscillator.

Furthermore, while it has been found to be desirable to employ a servo controlled oscillator 34, or the like, for most applications of the invention, it will be appreciated that in other applications, for example, where the factor $x$ is large and the optimal correction by oscillator 33 is small, it is within the purview of this disclosure to delete the oscillator 34 entirely and to apply the output of locked oscillator divider 33 to the antenna 41.

The monitoring and comparison means of the system of this invention comprises mixer 51, zero-crossing detector 52, pulse circuit 53, pulse forming and delay means 54, gating means 55 and 56, phase shift means 57, and means for controlling the phase shift means 57, in this embodiment, the motor 58 and motor controller means 59, together with bistable switch means 61 which is actuated to pass or prevent passage of the output of set signal source 62 as required.

In operation of the monitoring and comparison means, zero detector 52 is connected to pulse circuit 53 which produces a spike pulse signal indicative of a zero crossing, that is, a periodic in-phase relationship between the outputs of the standard signal sources 11 and 12.

It will be appreciated that zero-crossing detector 52 may be a relatively simple device which alerts either by the initiation or the discontinuation of a selected signal. For example, detector 52 may be a bistable device of the Schmitt Trigger Circuit variety, if desired.

Likewise, pulse forming and delay means 54 may be a bistable flip-flop device of the Schmitt Trigger Circuit variety which incorporates a built-in time constant and is responsive to positive or negative input pulses whereby a pulse output having a constant pulse width is obtained for each transition of bistable switch means 61. It will be appreciated that in general, the pulse width of the output of pulse forming means 54 should be slightly greater than the period between zero crossings. Usually, of course, multiplication of the output frequencies of sources 11 and 12 insures the existence of this pulse width relation.

Gating means 55 may be a conventional AND gate in which two simultaneous inputs are required to obtain an output. In a preferred embodiment, the output of pulse forming means 54, having an output pulse slightly wider than the output pulse of pulse circuit 53, effectively opens the gate for a selected period during which the output of pulse circuit 53 is permitted to pass. Alternatively, of course, gating means 55 may incorporate output pulse generating means actuated by the simultaneous occurrence of the outputs of pulse circuit 53 and pulse forming means 54.

Gating means 56 is connected in cascade with set signal source 62 and bistable switch 61 to control bistable switch 21 upon actuation of gating means 56 by the output of gating means 55 such that operation of bistable switch 21 occurs at a zero-crossing point.

In accordance with the invention, the output of pulse forming and delay means 54 and the output of gating means 55 are applied also to motor control means 59 which is adapted to adjust the phase of the output of one of the standard signal sources 11 and 12, as required, by means of motor 58.

It will be appreciated that motor control means 59 may be any means compatible with the motor 58. For example, motor control means 59 may be a D.C. voltage supply adapted to apply a D.C. voltage of gradually increasing level and of selected polarity on signal from pulse forming means 54 in the absence of a signal from gating means 55.

Thus the above described circuitry provides for automatic phase adjustment of one of the frequency sources 11 or 12 to insure that the mark and space frequencies are in phase and that the gating of gate 56 is synchronized in a fixed relation therewith. In a typical operation, for a shift of 50 cycles, a zero crossing (an in-phase condition) will occur at each $\frac{1}{50}$ second or 20 milliseconds. If a multiplication-division factor of 4 is involved, a zero crossing will occur at each of 5 milliseconds. Thus the amount of correction to insure synchronization of the FSK keyer is minimized and the invention enables positive keying at the zero point.

It will be appreciated, of course, that the device of this invention is not restricted to the exemplary embodiment disclosed herein and that other types of phase correction means might be substituted for the motor controlled mechanical phase correction means, if desired. Thus, in the absence of motor driven means, a non-linear solid-state device, for example, might be employed to cause an incremental delay variation.

Further, it is understood that various modifications well known in the art may be incorporated in the device of this invention in conventional manner, if desired. In particular, selected signal monitoring equipment may be incorporated and may be utilized as required for compensation purposes either by manual or automatic correction.

Finally, it is understood that the device of this invention is only to be limited by the scope of the claims appended hereto.

What is claimed is:

1. Frequency shift keying means comprising first and second frequency sources which provide signal outputs at first and second frequencies, respectively; first bistable gating means having at least first and second inputs and at least one output, said first bistable gating means passes signals applied to said first and second inputs in alternate order and including control means for controlling the operational state thereof; first and second frequency multiplier means connecting the outputs of said first and second frequency sources to said first and second inputs, respectively, of said first bistable gating means and each multiplying said signal outputs by the same selected numerical factor $x$; output utilization means; frequency divider means connecting the output of said first bistable gating means to said output utilization means and dividing by same said selected numerical factor $x$; frequency mixer means connected to said first and second frequency sources to combine the outputs thereform; first pulse generating means connected to said frequency mixer means to generate a spike pulse signal coincident with each periodic in-phase relation between the outputs of said first and second frequency sources; set pulse signal source means for energizing said control means of said first bistable gating means, said control means comprising second bistable gating means and third gating means connected in cascade to provide a signal path between said set signal source and said first gating means; second pulse generating means responsive to change in operational state of said second bistable gating means, and operated thereby to produce an output pulse of selected width; AND gate means providing an output pulse in response to coincident input pulses; means connecting the outputs of said first and second pulse generating means to the inputs of said AND gate means; phase shifting means connected to one of said first and second frequency sources to shift the phase of the output thereof, said phase shifting means including control means; means connecting the output of said second pulse generating means to said control means of said phase shifting means to initiate operation thereof; means connecting the output of said AND gate means to said control means of said phase shifting means to discontinue operation thereof; and means connecting the output of said AND gate means to said third gating means to permit set signal passage therethrough.

2. Frequency shift keying means as defined in claim 1 wherein said frequency mixer means combine the outputs of said first and second frequency sources after multiplication by said first and second frequency multiplier means, respectively.

3. Frequency shift keying means as defined in claim 1 wherein the width of the output pulse of said second pulse generating means is greater than the period between spike pulses in the output of said first pulse generating means.

4. In a frequency shift keyer including constant factor frequency multipliers, the outputs of which are alternately gated to a constant factor frequency divider, a phase correction circuit comprising:

zero-crossing detecting means receiving and comparing the signals to be keyed by said alternate gating means, said zero-crossing detecting means providing an output pulse at each in-phase coincidence of said signals to be keyed;

time delay means providing a constant width output pulse for each input pulse received;

an AND gate, said AND gate providing an output upon the coincidence of input signals from said time delay means and said zero-crossing detecting means;

control means actuating said alternate gating means upon receipt of an output signal from said AND gate and simultaneously providing an input pulse to said time delay means;

and phase shift means connected to said AND gate and to said time delay means, said phase shift means to adjust the phase of one of said signals to be keyed in a direction determined by the difference between the signals supplied to said phase shift means by said AND gate and said time delay means, whereby said signals to be keyed are in phase and in synchronization with the actuation of said alternate gating means.

References Cited by the Examiner

UNITED STATES PATENTS 3,031,527 4/62 Barton et al. ---------- 178—66

DAVID G. REDINBAUGH, *Primary Examiner.*